Oct. 25, 1949.                  J. A. WAGNER                  2,486,082
                            SYNCHRONIZING MECHANISM
Filed Nov. 7, 1946                                           3 Sheets-Sheet 1
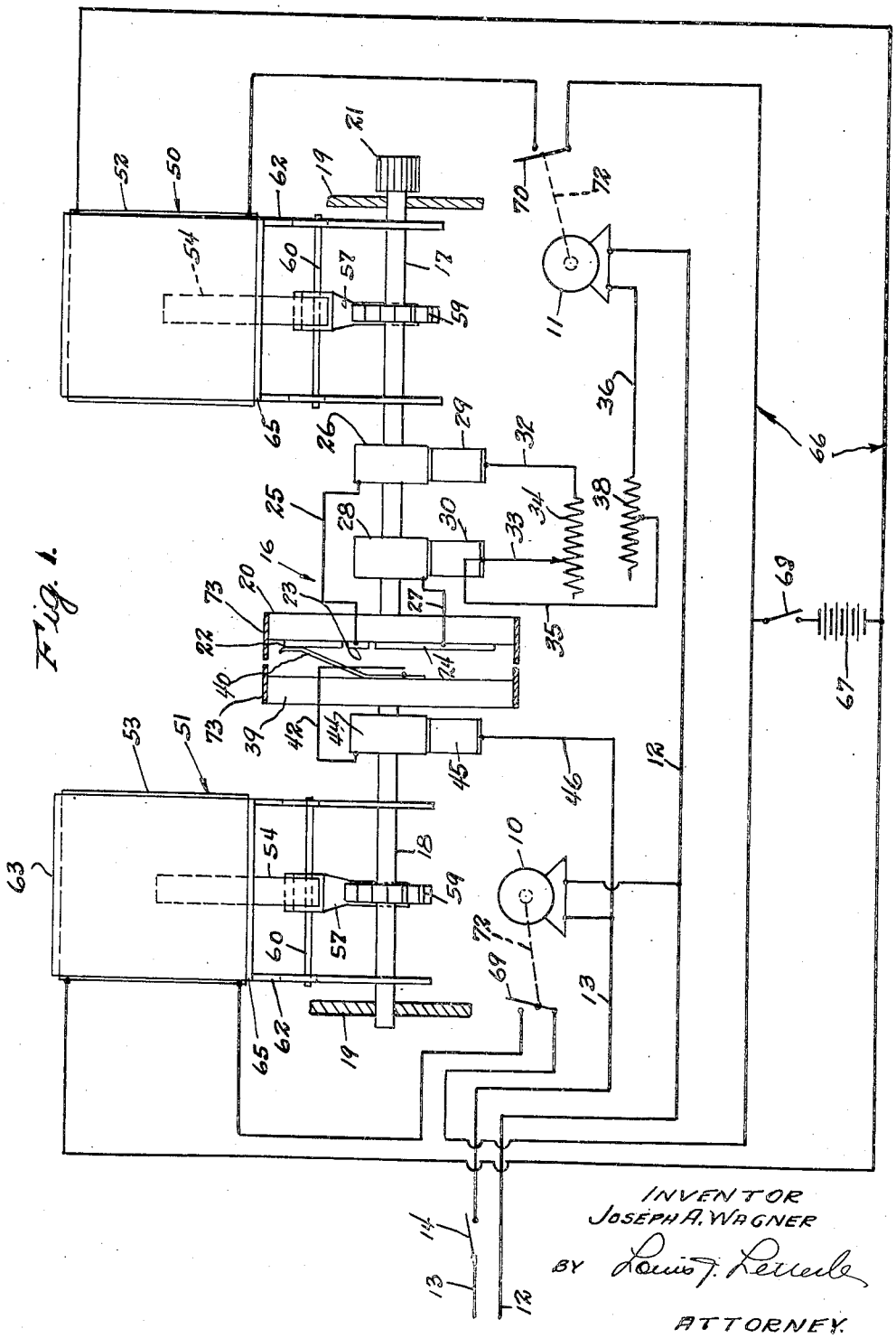
INVENTOR
JOSEPH A. WAGNER
BY Louis J. Letteile
ATTORNEY.

Oct. 25, 1949. J. A. WAGNER 2,486,082
SYNCHRONIZING MECHANISM
Filed Nov. 7, 1946 3 Sheets-Sheet 2
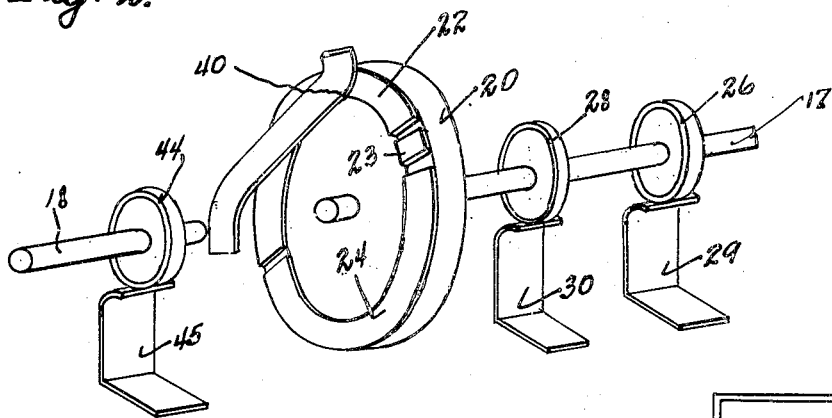
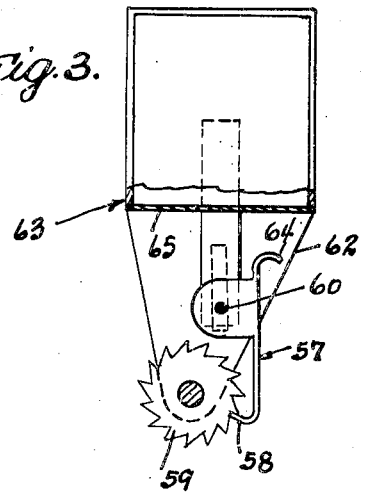
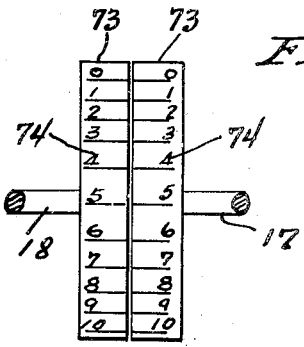
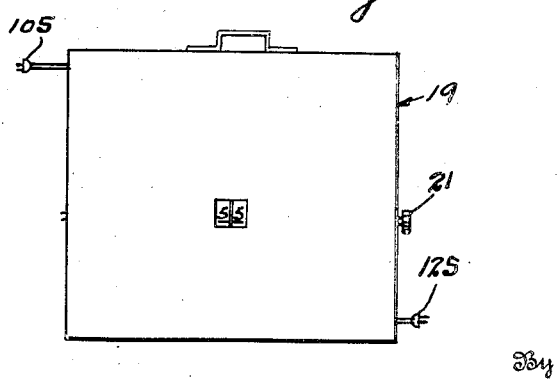
Inventor
JOSEPH A. WAGNER
By Louis J. Letterle
Attorney

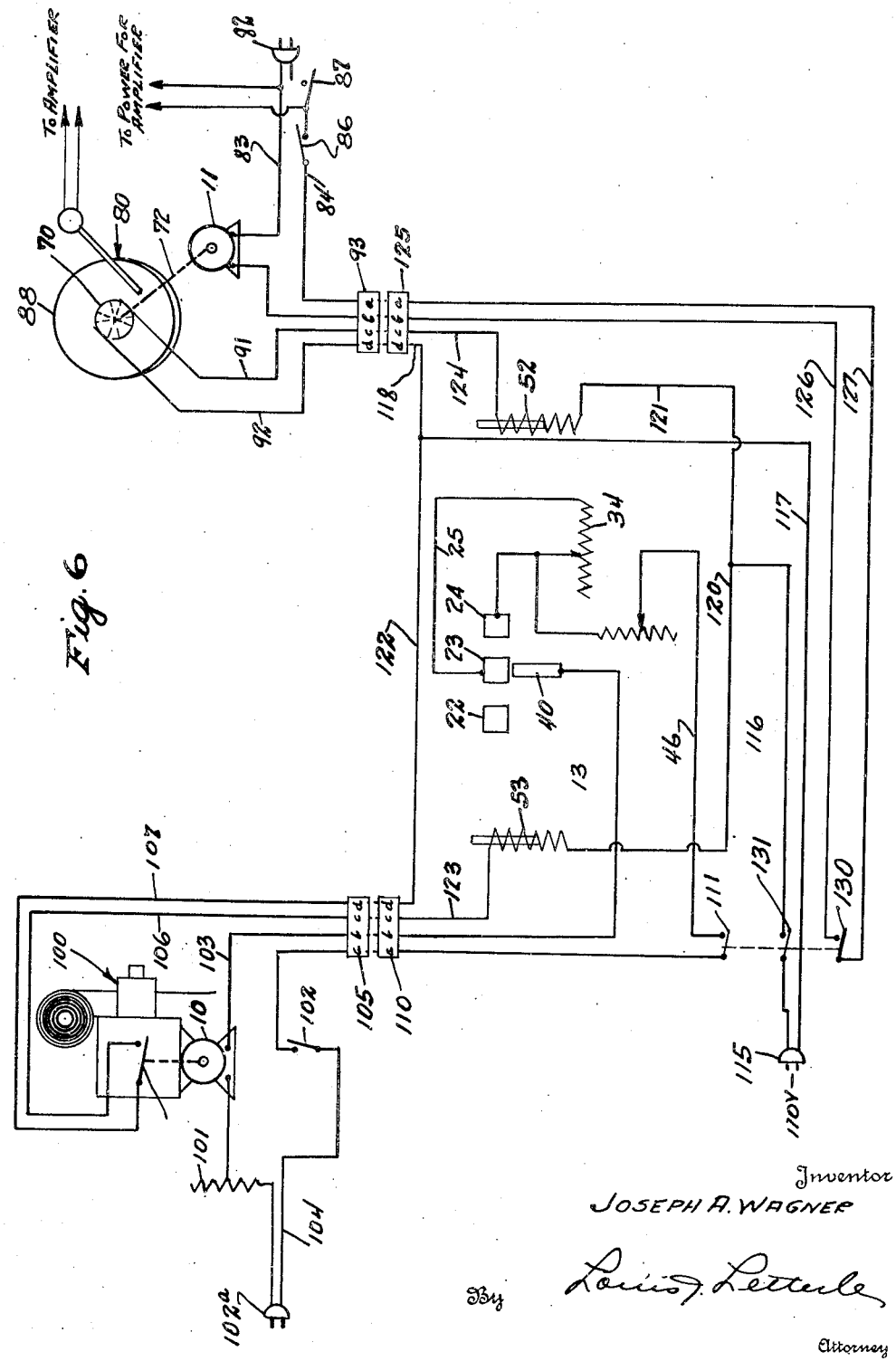

Patented Oct. 25, 1949

2,486,082

UNITED STATES PATENT OFFICE 2,486,082

SYNCHRONIZING MECHANISM

Joseph A. Wagner, Verona, Pa., assignor to Wagneradio Company, Verona, Pa., a corporation Application November 7, 1946, Serial No. 708,424

4 Claims. (Cl. 318—74)

1

The invention relates to a synchronizing apparatus and it has particular relation to an apparatus for maintaining a constant ratio between the speed of a pair of motor driven shafts.

While the invention has many applications it is particularly adapted for the production of home sound movies.

The primary object of the invention is to provide an apparatus whereby two shafts will run at exactly the same rate of speed and is so designed that, in the event one of the shafts changes speed for any reason, the other shaft will automatically be brought to the same speed.

Another object of the invention is to provide an apparatus whereby a phonograph record or a recorder can be synchronized with a movie camera or with a movie projector, with the presenting of sound movies at a relatively low cost.

These and other objects of the invention will be apparent from the following description and the accompanying drawings, in which:

Fig. 1 is an elevational view, partly in section of an apparatus constructed in accordance with the invention.

Fig. 2 is a perspective view, diagrammatic in form, showing a portion of the mechanism embodied in the invention.

Fig. 3 is an elevational view showing one form of a stepper arrangement employed in the invention.

Fig. 4 is an elevational view showing a structure for a synchronizing indicator.

Fig. 5 is an elevational view of the invention mounted in a carrying case.

Fig. 6 is a schematic wiring diagram of the invention as employed in the production of home movies.

Referring to the drawings in detail as illustrated in Figures 1 and 2, electric motors 10 and 11 are adapted to be operated by a source of electric current through wires 12 and 13. A suitable switch 14 is provided for connecting the motors to the supply wires 12 and 13. In accordance with the invention, the speed of a shaft driven by motor 11 is controlled at a constant value with respect to the speed of the shaft driven by the motor 10, referred to as the controlling or reference shaft.

To accomplish this, a mechanism 16 is provided with a pair of shafts 17 and 18, supported by suitable bearings in a case or container 19. The shaft 17 is provided adjacent one end thereof with a member 20 of insulating material such as Micarta or Bakelite, and at the other end thereof with a knob 21, the purpose of which will hereafter be described. Secured to one face of the member 20 are conductor elements 22, 23 and 24, formed in segments and spaced to form substantially an annular member. An electrical wire 25, operatively connects segment 23 to a slipring 26 mounted on shaft 17, and wire

2

27 connects segment 24 to a slipring 28 also mounted on shaft 17 in spaced relation with slipring 26. Brushes 29 and 30 are provided in contact relation with rings 26 and 28 respectively, and these in turn are connected together through wires 32 and 33 and rheostat 34. Conductors 35 and 36 and rheostat 38 operatively connect brushes 29 and 30 to motor 11.

Shaft 18, which is positioned adjacent to shaft 17 in end to end relation, has mounted adjacent one end thereof a member 39 of insulating material. A spring contact arm 40 secured to the member 39 is adapted to operatively engage the members 22, 23 and 24 through conductor 42, slipring 44 mounted on shaft 18, contact brush 45 and conductor 46 connected to supply line 13.

Stepper units 50 and 51 having solenoids 52 and 53 are provided to actuate the shafts 17 and 18 respectively. Each solenoid is provided with a plunger 54 which lifts upon application of current to the coil of the solenoid. This in turn actuates a latch 57 having an extension 58 engaging a tooth of a gear 59 of ratchet type, thus turning the shafts. The latch 57 is secured to the plunger 54 by means of a pin 60 which acts as a guide for maintaining the plunger in alignment by moving within a slot provided in sides 62 of a frame 63. An upwardly extending portion 64 on the latch is provided to engage a plate 65 of the frame 63, thus limiting the upward movement of the plunger and maintaining the latch in close contact with the gear 59 to prevent the gear from moving from inertia. An electrical circuit 66 connected to solenoids 52 and 53 is provided with a source of supply indicated in Figure 1, for the sake of convenience as a battery 67. A switch 68 operated with the switch 14 is provided in the circuit, as are switches 69 and 70 operatively connected to motors 10 and 11 respectively, by any well-known means and indicated in broken lines at 72. As shown in Figure 5, the invention is encased in the container 19, and for the purpose of providing visual means for indicating exact synchronization, the outer periphery of the members 20 and 39 are each provided with annular member 73 having indicia 74 thereon. It is to be noted that the quantity of numerals on the member 73 will coincide with the number of teeth employed in the gears of the stepper mechanism.

In operation, the knob 21 on the end of the shaft 17 is turned until arm 40 rests on segment 23 with the switches 69 and 70 in the correct position, just opening or closing, together with the proper adjustment on the resistors 34 and 38. Switches 14 and 68 are closed, starting motors 10 and 11, which in turn open and close switches 69 and 70 by the means indicated at 72. Each time either switch 69 or 70 is closed, solenoids 52 and 53 respectively become energized, lifting plunger and latch, thereby turning gear the distance of one tooth. With both motors in phase and synchronized, the solenoids will both be energized at the same instant and the same number of times. Therefore, as long as the controlled motor is operating at the correct speed, arm 40 will stay on segment 22. However, in practice there will be a slight drift of speed, and sooner or later the contact 40, for a fraction of a pulse, will leave segment 23 and touch segment 24, therefore shorting out resistor 34 and speeding up motor 11; or it may leave segment 24 going in the other direction and open circuit entirely, thereby slowing motor 11. It will be noted that any variation in the voltage source or change in load upon either motor would tend to disrupt the phase relationship and relative synchronization, but the action of the shafts 17 and 18 through arm 40 and segments 22, 23 and 24, instantly and continuously corrects this, maintaining motors in proper synchronization.

In employing the invention to provide sound pictures, particularly with projectors using films of ordinary cameras and ordinary home-type phonographs, attention is directed to Figure 6 in which a phonograph 80 is provided with the motor 11, operated by means of power through plug 82 conductors 83 and 84, together with switches 86 and 87. Mounted on a turntable 88 is switch 70, operatively connected to motor 11 by means as indicated at 72, as shown in Figure 1. The conductors 83 and 84 are connected to poles $a$ and $b$ of a four pole plug 93 with one end of conductors 91 and 92 connected to poles $c$ and $d$ of the plug, and the other end engaging switch 70. A projector 100, the speed of which is to be controlled, is provided with motor 10, operatively connected to switch 69 as indicated in Figure 1. In addition, the projector is provided with a speed rheostat 101, a switch 102 and a plug 102A, connected in an electrical circuit including wires 103 and 104 secured to poles $a$ and $b$ of a four pole plug 105 with wires 106 and 107 extending from switch 69 to poles $c$ and $d$ of plug 105. It is to be noted that existing equipment may be employed with very little change in structure. The segments 22, 23 and 24, together with contact arm 40, are operatively connected together the same as shown in Figure 1, with conductors 13 and 46 connected to poles $a$ and $b$ of a four pole plug 110. It is to be noted that in operation, poles $a$ and $b$ of plug 105, and poles $a$ and $b$ of plug 110 are connected to one another respectively, forming a controlled speed circuit which may also include switch 111.

As shown in Figure 6, the power for the controlling circuit is provided directly from 110 volt line by means of a plug 115 through wires 116, 117 and 118, operatively connected to solenoids 50 and 51 by means of conductors 120, 121, 122, 123 and 124 of circuit 66 as indicated in Figure 1. One end of conductor 123 is connected to pole $c$ with an end of conductor 122 connected to pole $d$ of plug 110 which in operation engages corresponding poles on plug 105. Conductors 118 and 124 are connected to poles $c$ and $d$ of a four pole plug 125. One end of conductors 126 and 127 may be connected to poles $a$ and $b$ of plug 125, with the other end of each conductor connected to switch 130. A main switch 131 is connected in the circuit and may control the whole circuit by being mechanically connected with switches 111 and 130, or each switch may be operated separately.

In operation of the synchronizer with a projector and phonograph, which may be placed at some distance from one another, the power to each is supplied through plugs 102A and 82. With power being supplied through plug 115 of the synchronizer, the switch 131 is closed, starting the entire equipment. As mentioned before, switches 111 and 130 may be used with switch 131 or operated separately. With the shafts 17 and 18 in phase and contact 40 engaging segment 23, the remainder of the operation is similar to that described for the structure shown in Figure 1.

While specific embodiments of the invention have been described to illustrate the application of the principles thereof, it will be understood that the invention may be otherwise embodied without departing from the principles thereof, or departing from the scope of the appended claims.

What I claim is:

1. A synchronizing system comprising a pair of concentric shafts, a two element rotary switch, said switch elements mounted on the facing ends of the shafts, means including solenoids for independently operating the elements of said switch and an external electrical circuit connecting the solenoids and the switch directly into the circuit of the apparatus to be synchronized.

2. A synchronizing system comprising a two element rotary switch, formed of a contact arm and a two sector switch element, one of the sectors being substantially larger than the other, said arm and switch element each independently operated, the switch, when system is in correct phase, so positioned that the contact arm contacts the smaller of the sectors and an external electrical circuit having a resistance, manually variable, in parallel with the two sector contacts.

3. A synchronizing system comprising a pair of shafts positioned in end to end relation, a two sector rotary switch element, formed of one relatively small sector and one larger sector, the latter extending over approximately half the angular radius of an insulated mounting, a switch arm on the other shaft, said arm adapted to contact the switch element, means including solenoids operating the switch element and the arm and an external electrical circuit connecting the solenoids and switch element directly into the circuit of the apparatus to be synchronized.

4. A synchronizing system comprising a two element rotary switch, said switch element mounted on the extremities of facing concentric shafts, means including solenoids mounted on the shafts, for independently operating the switch elements and an electrical circuit connecting the solenoids and rotary switch elements directly into the circuit of the apparatus to be synchronized.

JOSEPH A. WAGNER.

REFERENCES CITED

The following references are of record in the file of this patent:

UNITED STATES PATENTS

| Number | Name | Date |
|---|---|---|
| 993,610 | Mathelot et al. | May 30, 1911 |
| 1,749,842 | Pfretzchner | Mar. 11, 1930 |

FOREIGN PATENTS

| Number | Country | Date |
|---|---|---|
| 324,005 | Great Britain | Jan. 14, 1930 |
| 325,882 | Great Britain | Mar. 3, 1930 |
| 331,256 | Great Britain | June 27, 1930 |
| 720,933 | France | Dec. 3, 1931 |